United States Patent
Fujii et al.

(10) Patent No.: US 10,795,726 B2
(45) Date of Patent: Oct. 6, 2020

(54) PROCESSING REQUESTS RECEIVED ONLINE AND DIVIDING PROCESSING REQUESTS FOR BATCH PROCESSING

(71) Applicant: Hitachi, Ltd., Tokyo (JP)

(72) Inventors: Yousuke Fujii, Tokyo (JP); Toshiyuki Hasegawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 365 days.

(21) Appl. No.: 15/308,373

(22) PCT Filed: Nov. 17, 2014

(86) PCT No.: PCT/JP2014/080354
§ 371 (c)(1),
(2) Date: Nov. 2, 2016

(87) PCT Pub. No.: WO2016/079786
PCT Pub. Date: May 26, 2016

(65) Prior Publication Data
US 2017/0068569 A1    Mar. 9, 2017

(51) Int. Cl.
G06F 9/48    (2006.01)
G06F 9/46    (2006.01)
G06F 9/50    (2006.01)

(52) U.S. Cl.
CPC .............. G06F 9/4887 (2013.01); G06F 9/46 (2013.01); G06F 9/48 (2013.01); G06F 9/50 (2013.01)

(58) Field of Classification Search
CPC combination set(s) only.
See application file for complete search history.

(56) References Cited

U.S. PATENT DOCUMENTS 5,826,078 A * 10/1998 Funaki ................ G06F 11/1415
                                                                     718/100
8,346,591 B2 * 1/2013 Fellenstein ............ G06Q 40/04
                                                                     703/2
(Continued)

FOREIGN PATENT DOCUMENTS

JP    2000-207265 A    7/2000
JP    2006-092219 A    4/2006
(Continued)

OTHER PUBLICATIONS

International Search Report of PCT/JP2014/080354 dated Dec. 9, 2014.

*Primary Examiner* — Shanto Abedin
*Assistant Examiner* — Bruce S Ashley
(74) *Attorney, Agent, or Firm* — Mattingly & Malur, PC

(57) ABSTRACT

A computer system includes a plurality of processes which execute processing requests, a control unit, and an all-order distribution unit. When the control unit determines execution of a second processing request with a lower priority order than a first processing request, the control unit creates a divided second processing request based on the second processing request in accordance with a division size determined in advance. The all-order distribution unit determines an execution order of one or more processing requests including at least one of one or more divided second processing requests corresponding to one or more second processing requests and one or more first processing requests, and respectively causes the plurality of processes to execute the one or more processing requests in the determined execution order.

14 Claims, 12 Drawing Sheets

(56) References Cited

U.S. PATENT DOCUMENTS

| | | | |
|---|---|---|---|
| 9,563,470 B2* | 2/2017 | Modani | G06F 9/4881 |
| 9,626,120 B1* | 4/2017 | Jia | G06F 3/0631 |
| 2006/0061578 A1 | 3/2006 | Washizu | |
| 2007/0050779 A1* | 3/2007 | Hayashi | G06F 9/4887 |
| | | | 718/108 |
| 2013/0145105 A1* | 6/2013 | Sawicki | G06F 3/0619 |
| | | | 711/147 |

FOREIGN PATENT DOCUMENTS

| | | | | |
|---|---|---|---|---|
| JP | 2008 198153 | * | 8/2008 | G06F 9/48 |
| JP | 2010-283635 A | | 12/2010 | |

* cited by examiner

FIG. 7

Division history table
141

| Batch ID | Batch storage destination | Division size | Estimated number of divisions | Average execution time | Average execution interval |
|---|---|---|---|---|---|
| 00000001 | /usr/batchA | 8 | 1750 | 26 | 10 |
| 00000002 | /usr/batchB | 3 | 600 | 14 | 8 |

FIG. 8

Batch management table
142

| Batch ID | Batch name | Start time point | End time point | Position | Total number | Number of divisions |
|---|---|---|---|---|---|---|
| 00000001 | batchA | 2014/08/23/ 19:00:21 | null (being executed) | 18904 | 32904 | 4801 |
| 00000002 | batchB | 2013/08/23/ 18:29:11 | 2013/08/23/ 22:34:31 | null | 5981 | 2002 |

FIG. 9

Batch execution-in-progress screen
900

| BatchName | 911 | 912 | 913 Progress | 914 StartTime | 915 ElapsedTime | 916 PredictedEndTime |
|---|---|---|---|---|---|---|
| batchA | | | 30% | 17:08:12 | 1:00:04 | 20:32:18 |
| batchB | | | 50% | 16:05:10 | 2:03:06 | 20:11:28 |

FIG. 10

Batch execution result screen
1000

```
                            Result
============================================================
1001 ── BatchName           :  batchA
1002 ── StartTime           :  2014/01/03  17:08:12
1003 ── EndTime             :  2014/01/03  20:38:24
1004 ── TotalExecuteTime    :  3:30:12
1005 ── DividedCount        :  42149
1006 ── Average Latency Time:  413(us)
1007 ── Online Delay Rate   :  30(%)
1008 ── EffectiveTerm       :  2014/01/03  18:00 --- 2014/01/03 18:30
1009 ── IneffectiveTerm     :  2014/01/03  19:20 --- 2014/01/03 10:40
============================================================
```

PROCESSING REQUESTS RECEIVED ONLINE AND DIVIDING PROCESSING REQUESTS FOR BATCH PROCESSING

TECHNICAL FIELD

The present invention generally relates to processing of data of a processing request.

BACKGROUND ART

For example, an apparatus disclosed in PTL 1 is known in relation to processing of data of a processing request. The apparatus disclosed in PTL 1 processes a transaction by dividing the transaction into prescribed blocks.

CITATION LIST

Patent Literature

[PTL 1]
Japanese Patent Application Publication No. 2000-207265

SUMMARY OF INVENTION

Technical Problem

Distributed systems for processing data such as big data are known. A distributed system generally includes a plurality of physical computers (for example, physical servers).

While a distributed system processes a plurality of processing requests, priority orders (for example, restrictions on time required for processing) of the processing (the processing requests) are not necessarily the same. For example, there are online processing and batch processing. Online processing is processing which requires latency performance and an example thereof is a processing request (for example, a data I/O request) received online. On the other hand, batch processing is processing for which a relatively long processing time is allowed and an example thereof is processing in which a batch of processing on a plurality of pieces of data is collectively executed (specific examples include data migration due to addition or deletion of a physical computer, aggregation of data in a physical computer, and deletion of a plurality of pieces of data from a physical computer). Therefore, generally, online processing has a higher priority order than batch processing.

As a method of maintaining stable online processing performance, a method is conceivable in which batch processing is performed by dividing the batch processing based on the transaction division technique described in PTL 1.

However, while PTL 1 discloses transaction division in a single apparatus, data processing in each of a plurality of physical computers is neither disclosed nor implied. In an environment where data consistency must be maintained among two or more physical computers, when each of the two or more physical computers independently perform batch processing by dividing the batch processing, data consistency cannot always be maintained.

Problems of this kind may also exist among a plurality of processing with different priority orders other than online processing and batch processing. In addition, problems of this kind may also exist in other types of systems in which each of a plurality of processes perform processing of data of a processing request in addition to a distributed system constituted by a plurality of physical computers.

Solution to Problem

A computer system includes a plurality of processes which execute processing requests, a control unit, and an all-order distribution unit. When the control unit determines execution of a second processing request with a lower priority order than a first processing request, the control unit creates a divided second processing request based on the second processing request in accordance with a division size determined in advance. The all-order distribution unit determines an execution order of one or more processing requests including at least one of one or more divided second processing requests corresponding to one or more second processing requests and one or more first processing requests, and respectively causes the plurality of processes to execute the one or more processing requests in the determined execution order.

The "process" may be a physical computer, a virtual computer, a processor in a physical computer or a virtual computer, or a program executed by a processor.

The control unit and the all-order distribution unit may be included in each of at least one of the plurality of processes (for example, every one of the processes may include the control unit and the all-order distribution unit) or may exist outside of the plurality of processes (for example, in a process other than the plurality of processes).

The "division size" may be a size specified by a user (for example, a manager) or a size calculated based on prescribed information prior to division.

Advantageous Effects of Invention

A plurality of processing requests including two or more divided second processing requests corresponding to one or more second processing requests and two or more first processing requests are executed by each of a plurality of processes in a same execution order. Accordingly, a same result is obtained by the plurality of processes and, consequently, consistency of data is ensured.

BRIEF DESCRIPTION OF DRAWINGS

FIG. 7 shows a configuration of a divided batch history table.

FIG. 8 shows a configuration of a batch management table.

FIG. 9 shows an example of a batch execution-in-progress screen.

FIG. 10 shows an example of a batch execution result screen.

DESCRIPTION OF EMBODIMENT

Hereinafter, an embodiment will be described in which a server computer (an example of a physical computer) is adopted as a process.

Although information will be described below using expressions such as a "kkk table", information may be expressed by data configurations other than a table. At least one of "kkk tables" can be referred to as "kkk information" in order to show that information is not dependent on data configuration. A configuration of each table represents an example and two or more tables may be consolidated into one table or one table may be divided into a plurality of tables.

In addition, while a processing unit (function) may sometimes by expressed as a "kkk unit" in the following description, a processing unit may be realized as a computer program is executed by a processor (such as a CPU (central processing unit)) or may be realized by a hardware circuit (such as an FPGA (field programmable gate array) or an ASIC (application specific integrated circuit)). When a processing unit is realized by a program by a processor, since a prescribed process is to be performed by appropriately using a storage resource (such as a memory) and/or a communication interface device (such as a communication port), etc., the processing unit may be considered as constituting at least a part of the processor. Processing described using a processing unit as a subject may be considered processing performed by a processor or by an apparatus including a processor. Furthermore, a processor may include a hardware circuit which performs a part of or all of processing. A program may be installed to a processor from a program source. The program source may be, for example, a program distribution computer or a storage medium that can be read by a computer. The description of each processing unit represents an example and a plurality of processing units may be integrated into one processing unit or one processing unit may be divided into a plurality of processing units.

Figure 1:
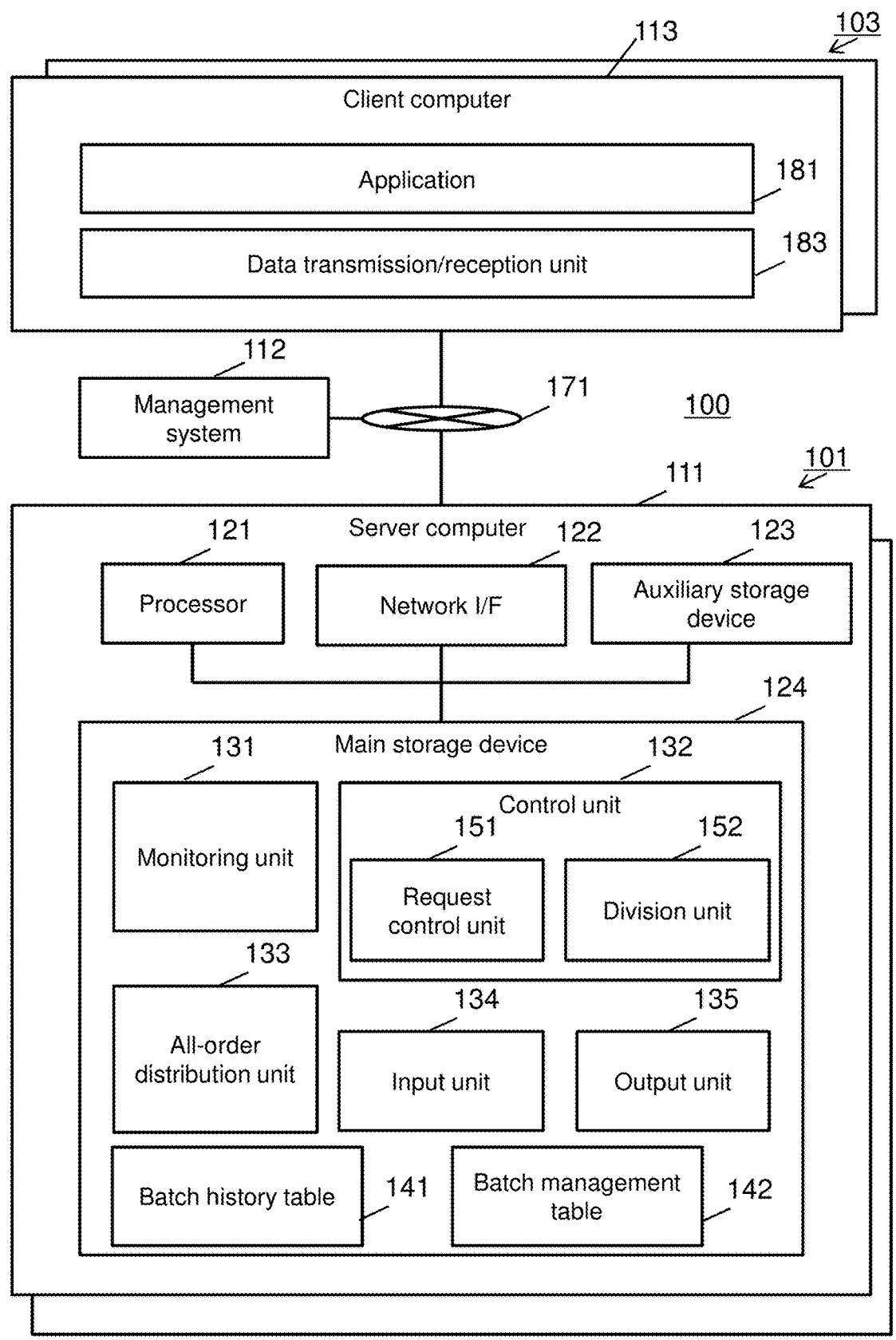
FIG. 1 shows a configuration of an information system according to an embodiment.

FIG. 1 shows a configuration of an information system according to an embodiment.

An information system 100 includes a server system 101 that is an example of a computer system, a client system 103 that is coupled to the server system 101 via a communication network 171, and a management system 112 of the server system 101.

The client system 103 is a plurality of client computers 113 (or one client computer 113). While the client computer 113 is a physical computer in the present embodiment, the client computer 113 may be a virtual computer instead. The client computer 113 includes an application 181 and a data transmission/reception unit 183. The application 181 transmits a processing request online to the server system 101 via the data transmission/reception unit 183. Hereinafter, a processing request transmitted online will be referred to as an "online request". The server system 101 processes the online request and returns a processing result (for example, a result of write processing or a result of read processing (for example, including data read in accordance with read processing)) to the client computer 113 as a response to the online request.

The management system 112 is a system constituted by one or more computers and is, for example, a management computer or a combination of a management computer and a display computer which displays information represented by display information output from the management computer. In other words, in the management system 112, at least one computer includes a display device and causes information from the server system 101 to be displayed on the display device.

The server system 101 is constituted by a plurality of server computers 111. In the present embodiment, the server system 101 is a distributed consensus system which is a distributed key-value store (distributed KVS) and which performs processing in accordance with a Paxos algorithm. Instead of such a distributed system, the server system 101 may be a distributed system of another type or a computer system of another type.

Each server computer 111 includes a network I/F (communication interface device) 122, a main storage device 124, an auxiliary storage device 123, and a processor 121 coupled to these devices. The main storage device 124 and the auxiliary storage device 123 are examples of storage resources. Hereinafter, one arbitrary server computer 111 among the plurality of server computers 111 will be referred to as a "first server computer 111A" and the first server computer 111A will be adopted as a representative example. In addition, one or more other computers which are to maintain consistency of data with the first server computer 111A will be each referred to as a "second server computer 111B". For example, when the first server computer 111A stores a key-value (a key and a value attributable to the key) set, the second server computer 111B is a computer storing a same key-value set (a copy of the key-value stored by the first server computer 111A). Moreover, each server computer 111 may function as the first server computer 111A or as the second server computer 111B.

The network I/F 122 receives an online request from the client system 103 (the client computer 113) via the communication network 171. The auxiliary storage device 123 is a non-volatile storage device such as an HDD (hard disk drive) or an SSD (solid state drive). The auxiliary storage device 123 includes, for example, a data store (a plurality of key-values). The processor 121 realizes processing units by executing a computer program loaded to the main storage device 124. Examples of the processing units include a control unit 132 (including a request control unit 151 and a division unit 152), a monitoring unit 131, an all-order distribution unit 133, an input unit 134, and an output unit 135. In addition, the main storage device 124 stores a division history table 141 and a batch management table 142 (to be described later). The division history table 141 and the batch management table 142 may be included in any of the processing units.

The request control unit 151 receives an online request and a batch request. An online request is an example of a first processing request and is a processing request received from the client computer 113 via the network I/F 122 (for example, a data input/output (I/O) request). A batch request is an example of a second processing request which has a lower priority order than a first processing request and is a processing request of data to be processed in a batch. In the present embodiment, in order to reduce a decline in online processing performance, an online request is prioritized over a batch request. Hereinafter, data that is a processing target of an online request will be referred to as "online data" and processing of one online request (processing of online data corresponding to one online request) will be referred to as "online processing". In addition, hereinafter, data that is a processing target of a batch request will be referred to as "batch data" and processing of batch data will be referred to as "batch processing". A source of an online request may be a node (a computer capable of communicating with the server system 101) on a network such as the client computer 113 and a source of a batch request may be a program or the like inside the client computer 113, a management computer (not shown) of the server system 101, or the server computer 111. When the request control unit 151 receives an online request, the request control unit 151 sends the online request to the all-order distribution unit 133. When the request control unit 151 receives a batch request, the request control unit 151 requests the division unit 152 to create a divided batch request. The request control unit 151 sends a divided batch request created in response to the request to the all-order distribution unit 133. Moreover, the request control unit 151 need not necessarily request the division unit 152 to divide a batch request.

The division unit 152 determines a division size of a batch based on monitoring result information from the monitoring unit 131. In response to the request from the request control unit 151, the division unit 152 creates a divided batch request based on the batch request in accordance with the determined division size. One divided batch request corresponds to divided data (a batch data portion) constituting batch data that is a processing target of one batch request. A size of divided data is, for example, a same size as the division size. The division size may be either fixed or variable with respect to one batch request. A determination (change) of the division size may be performed every time a division request is issued from the request control unit 151 or may be performed (for example, regularly) without a division request from the request control unit 151. The division unit 152 sends a divided batch request to the request control unit 151 every time a divided batch request is created. Moreover, the division unit 152 need not necessarily divide a batch request.

The monitoring unit 131 monitors execution of a processing request, a server load state, and the like. The monitoring unit 131 outputs monitoring result information which is information representing a monitoring result. For example, monitoring result information may include information indicating a progress of each processing request and information indicating a server load state. Progress of each processing request may include, for example, a status (unexecuted, being executed, completed, and the like) of each processing request and a start time point and an end time point of each processing request. A server load state includes, for example, at least a load state of the first server computer 111A (for example, resource usage (such as processor usage) of the first server computer 111A (and the second server computer 111B)). From such monitoring result information or an accumulation thereof, an idle time, a required online processing time, an online processing interval, and the like can be detected or calculated. Monitoring result information may be accumulated in storage resources including at least one of the main storage device 124 and the auxiliary storage device 123. Moreover, an "idle time" refers to a period in which online processing is not performed or, specifically, a difference between an online processing interval or an allowed latency time and a required online processing time. A "required online processing time" refers to the time required for one session of online processing (processing of one online request). An "online processing interval" refers to the time from start of an N-th (where N is an integer equal to or larger than 1) online processing session to start of an (N+1)-th online processing session. An "allowed latency time" refers to an allowable value of the required online processing time. An output destination of the monitoring result information may be at least one processing unit or a storage resource (for example, the main storage device 124 or the auxiliary storage device 123) which is referable by at least one processing unit.

The all-order distribution unit 133 determines an execution order of a plurality of processing requests (including two or more divided batch requests corresponding to one or more batch requests, and two or more online requests) from the request control unit 151. For example, the all-order distribution unit 133 may manage a queue in a FIFO (first-in first-out) format, and by inputting a processing request (for example, an online request or a divided batch request) from the request control unit 151 in an order received, the all-order distribution unit 133 may determine an execution order of a plurality of processing requests. Alternatively, the all-order distribution unit 133 may accumulate a prescribed number of processing requests from the request control unit 151 or may accumulate processing requests from the request control unit 151 for a certain period of time and determine an execution order of a plurality of accumulated processing requests based on at least a part of a policy (such as an end time point of a batch request) to be described later and monitoring result information. Accordingly, an execution order satisfying the policy can be determined. The all-order distribution unit 133 causes the control unit 132 (for example, the request control unit 151) and the second server computer 111B to execute a plurality of processing requests in the determined execution order. Specifically, for example, in accordance with a Paxos algorithm, the all-order distribution unit 133 transmits a proposal including a plurality of processing requests and information representing an execution order thereof to the second server computer 111B. When the all-order distribution unit 133 receives consent to the transmitted proposal from a certain number or more of the second server computers 111B, the all-order distribution unit 133 issues an indication to the control unit 132 (the request control unit 151) and the second server computer 111B to execute the plurality of processing requests in the determined execution order. Moreover, the all-order distribution unit 133 is configured, when receiving a proposal, to determine whether or not to consent to the proposal and give a response of consent or dissent to a transmission source of the proposal. In addition, the all-order distribution unit 133 is configured, when receiving an indication to execute a plurality of processing requests in an execution order described in a proposal from a transmission source of the proposal, to cause the control unit 132 (the request control unit 151) to execute the plurality of processing requests in the execution order.

The input unit 134 receives input of information including a policy. A policy includes a target value (for example, an end time point of a batch request) related to processing performance with respect to at least one of a batch processing request and an online processing request. For example, information including a policy may be input from a manager via the management system 112 and stored in a storage resource (at least one of the main storage device 124 and the auxiliary storage device 123).

The output unit 135 outputs information representing at least a part of the monitoring result information from the monitoring unit 131 (for example, monitoring result information received via the control unit 132). In addition, the output unit 135 (or the control unit 132) calculates a current progress of batch processing, a future progress of batch processing, a delay time of online processing, and the like based on at least a part of the monitoring result information. The output unit 135 outputs the calculated information. For example, the output unit 135 may output the information to the management system 112 and have the management system 112 display the information.

Instead of being included in each of the plurality of server computers 111, at least one of the control unit 132 (the request control unit 151 and the division unit 152), the monitoring unit 131, the all-order distribution unit 133, the input unit 134, and the output unit 135 may only be included in a third server computer included in the server system 101 (a server computer which does not belong to the plurality of the server computers 111 but which is coupled to the plurality of the server computers 111). The all-order distribution unit 133 of the third server computer may transmit data of an online request and divided data of a batch request in a determined order to each of two or more server computers 111.

Figure 2:
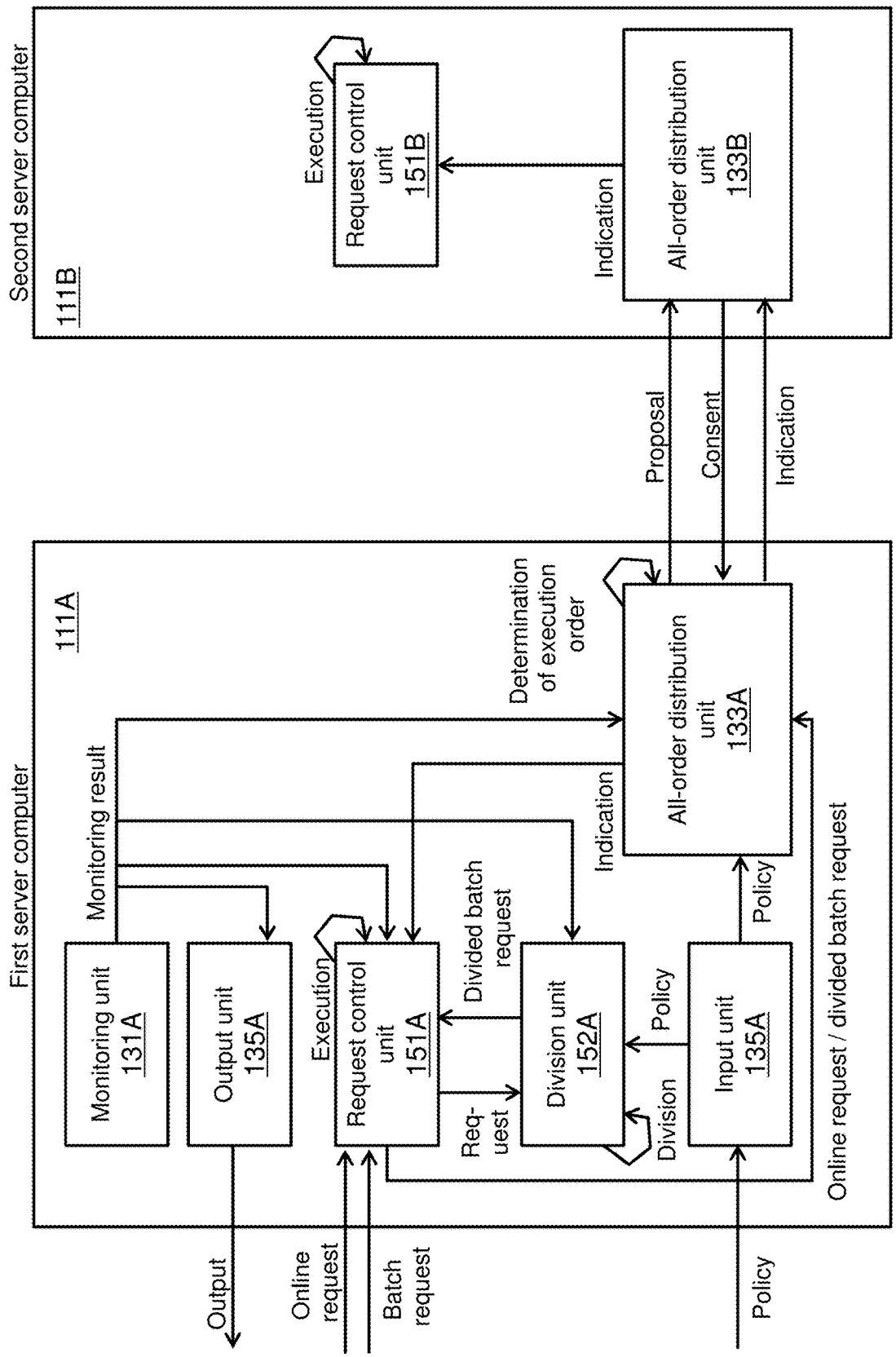
FIG. 2 shows an outline of processing performed by a first server computer and a second server computer.

FIG. 2 shows an outline of processing performed by the first server computer 111A and the second server computer 111B. Hereinafter, to avoid confusion, "A" may be suffixed to reference signs of elements of the first server computer 111A and "B" may be suffixed to reference signs of elements of the second server computer 111B in the following description. Moreover, while both the first server computer 111A and the second server computer 111B may receive an online request and a batch request, in the following description, the first server computer 111A may be the server computer which receives an online request and a batch request. When a failure occurs in the first server computer 111A, any of two or more second server computers 111B may become a first server computer 111A.

It is assumed that, in the first server computer 111A, a request control unit 151A executes each of a plurality of processing requests (including two or more online requests and two or more divided batch requests). In addition, it is assumed that a monitoring unit 131A is monitoring execution states of the plurality of processing requests and outputting monitoring result information. Furthermore, it is assumed that a policy has already been input via an input unit 134A. In such an environment, the output unit 135A receives a display request from a manager during execution of batch processing, after completing batch processing, or the like. When a display request is received, the output unit 135A (or a control unit 132A) calculates contents (for example, a state of progress of batch processing or a delay time of online processing) in accordance with specifications of the display request based on monitoring result information and the output unit 135A displays the calculated contents.

Let us assume that, in the first server computer 111A, the request control unit 151A has newly received an online request. The request control unit 151A sends the received online request to an all-order distribution unit 133A. The online request is, for example, accumulated in a queue. At this stage, the online request is in an unexecuted state.

In addition, let us assume that, in the first server computer 111A, the request control unit 151A has newly received a batch request. The request control unit 151A determines execution of the batch request. For example, the request control unit 151A determines execution of the batch request when monitoring result information from the monitoring unit 131A indicates that no online request is being executed (no online processing is being performed). After determining execution of the batch request, the request control unit 151A requests a division unit 152A to divide the batch request. In response to the division request, the division unit 152A creates a divided batch request based on the batch request in accordance with a division size and sends the created divided batch request to the request control unit 151A. When division of a batch request is still ongoing (when the received divided batch request is not a last divided batch request created from one batch request), the request control unit 151A causes a divided batch request to be newly created by making a division request to the division unit 152A. The division size may be determined by the division unit 152A based on at least a part of a policy and monitoring result information (specifically, for example, a policy and monitoring result information when receiving a division request) and a divided batch request may be created in accordance with the determined division size. The request control unit 151A sends a divided batch request to the all-order distribution unit 133A every time a divided batch request is obtained. The sent divided batch request is, for example, accumulated in a queue. At this stage, the divided batch request is in an unexecuted state.

In the first server computer 111A, the all-order distribution unit 133A determines an execution order of the plurality of accumulated processing requests (including two or more online requests and two or more divided batch requests). Each of the plurality of processing requests is a processing request in an unexecuted state. Based on at least a part of the policy (for example, a target value such as an end time point of a batch request) and the monitoring result information, the all-order distribution unit 133A is capable of determining an execution order which enables the policy to be adhered to. The all-order distribution unit 133A transmits a proposal including information relating to a plurality of processing requests that are processing targets (for example, the plurality of processing requests themselves) and the determined execution order to the second server computer 111B. In the second server computer 111B, an all-order distribution unit 133B receives the proposal and determines whether or not to consent to the proposal based on prescribed information, and sends back the determined reply (to consent or dissent) to a transmission source of the proposal (the all-order distribution unit 133A of the first server computer 111A).

In the first server computer 111A, when the all-order distribution unit 133A receives consent from a certain number or more of the second server computers 111B, the all-order distribution unit 133A issues an indication to the control unit 132 (the request control unit 151) in the first server computer 111A and to the second server computer 111B to execute processing in accordance with the proposal to which consent has been given (to execute the plurality of processing requests that are processing targets in the determined execution order). In response to the indication, in the first server computer 111A, the request control unit 151A executes the plurality of processing requests in the determined execution order. In addition, in response to the indication, in the second server computer 111B, the all-order distribution unit 133B issues an indication to a request control unit 151B to execute the plurality of processing requests in the determined execution order and the request control unit 151B executes the plurality of processing requests in the execution order.

Accordingly, a same plurality of processing requests are executed in a same order on the plurality of server computers 111 (the first server computer 111A and the one or more second server computers 111B). As a result, consistency of data is ensured among the plurality of server computers 111.

Figure 3:
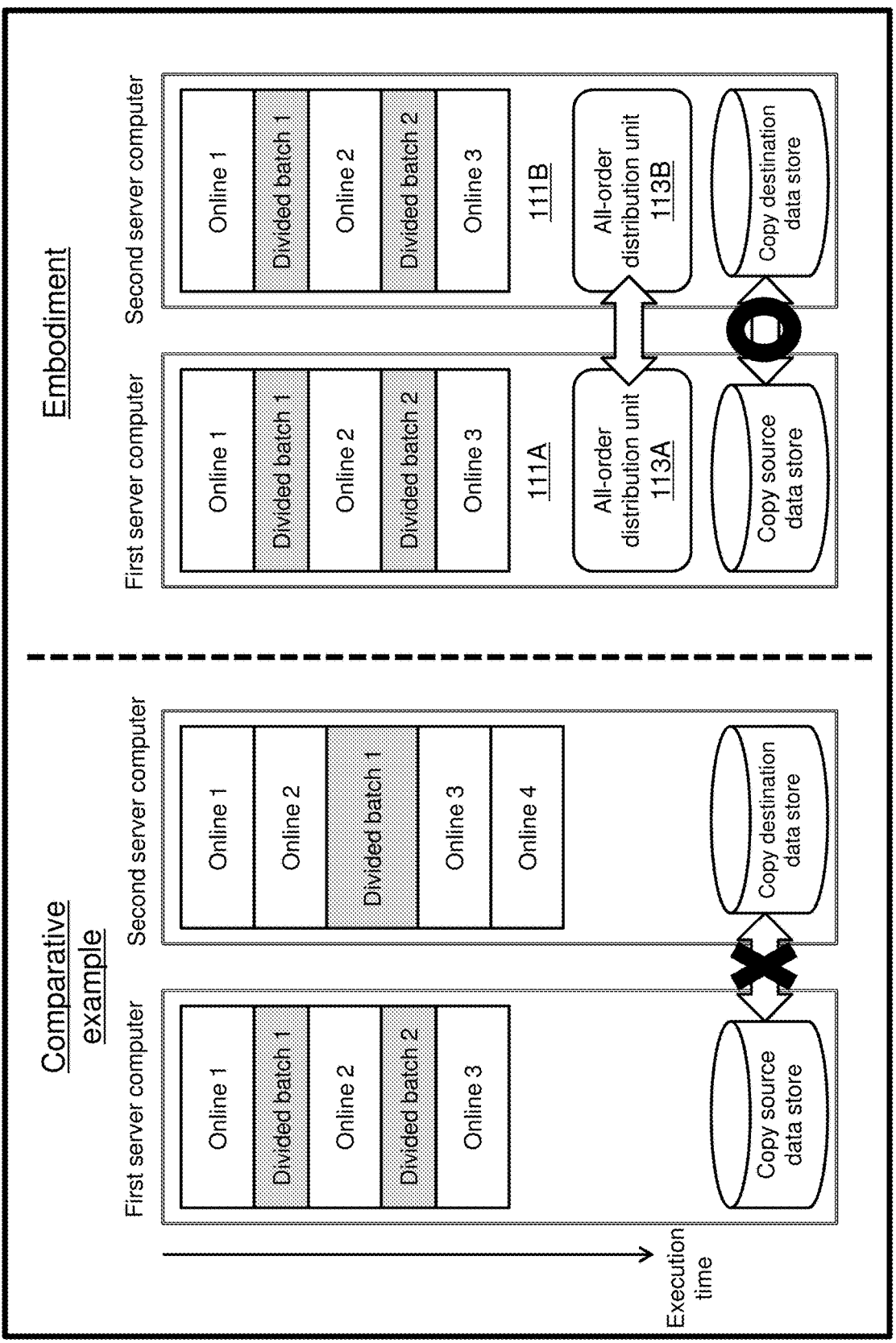
FIG. 3 shows an example of an outline of a comparison between a comparative example and an embodiment.
Figure 4:
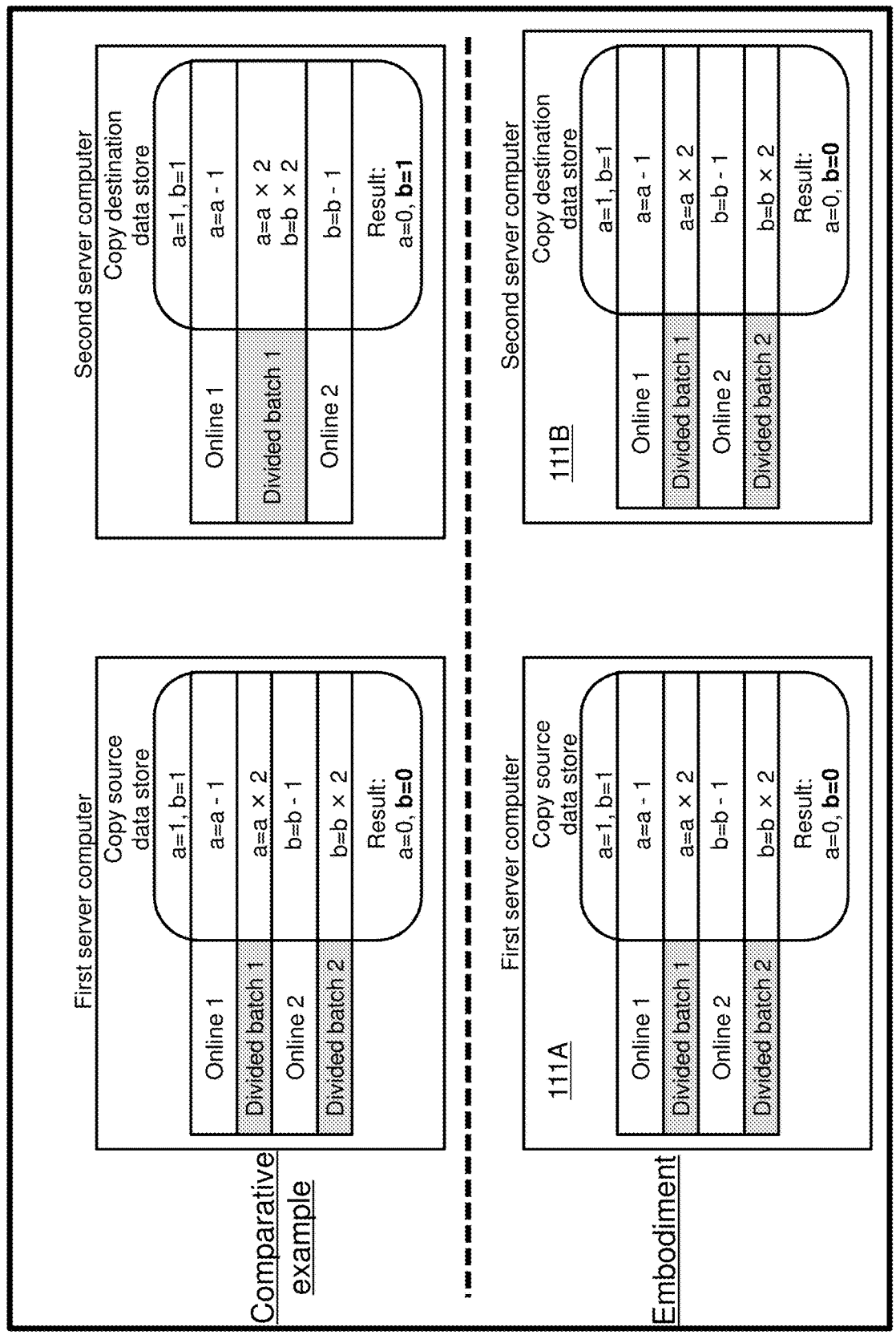
FIG. 4 shows a specific example of a comparison between a comparative example and an embodiment.

FIG. 3 shows an example of an outline of a comparison between a comparative example in which a division size and an execution order are independently provided for each of the first and second server computers 111A and 111B and the present embodiment in which a same division size and a same execution order are ensured for the first and second server computers 111A and 111B. FIG. 4 shows a specific example of a comparison between a comparative example in which a division size is independently provided for each of the first and second server computers 111A and 111B and the present embodiment in which a same division size is ensured for the first and second server computers 111A and 111B. As is apparent from FIG. 3 and FIG. 4, when each of the first and second server computers 111A and 111B independently divide a batch request based on an arbitrary division size or determine an execution order of processing requests, consistency of data is disrupted among the server computers 111A and 111B. According to the present embodiment, since the same plurality of processing requests are executed in the same execution order by the all-order distribution units 133A and 113B of the respective first and second server computers 111A and 111B, consistency of data is ensured.

As described above, in the present embodiment, processing requests are processed in serial due to the all-order distribution unit 133 being provided in each of the plurality of server computers 111. Therefore, online processing and batch processing are never executed in parallel. In addition, even when processing results of two or more processing requests are independent of an execution order of the processing requests, two or more processing requests among a plurality of processing requests are never executed in parallel. The plurality of processing requests are executed in serial (sequentially). Since such a configuration is provided as a premise, as will be described later, at least one of a division size and an execution timing of a divided batch request is desirably appropriate.

Hereinafter, the present embodiment will be described in greater detail using the first server computer 111A as an example.

Figure 5:
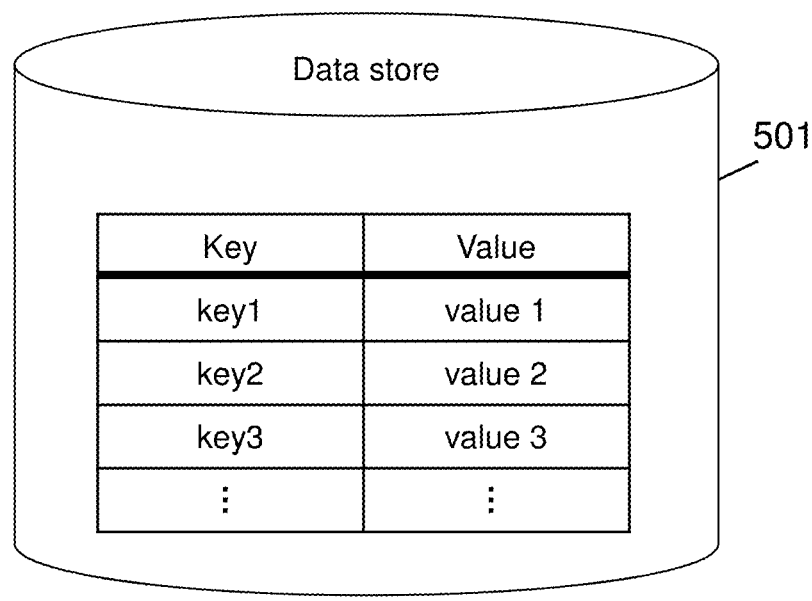
FIG. 5 shows a configuration of a data store.

FIG. 5 shows a configuration of a data store.

A data store 501 is an accumulation of a plurality of key-values. While such a data store is provided in at least one of the main storage device 124 and the auxiliary storage device 123 of the server computer 111 (for example, an entirety of or a part of the data store 501 may be provided in the main storage device 124 and a remainder may be provided in the auxiliary storage device 123), the data store may be provided in an external storage apparatus that is accessible by the server computer 111. A data store exists for each server computer 111.

Figure 6:
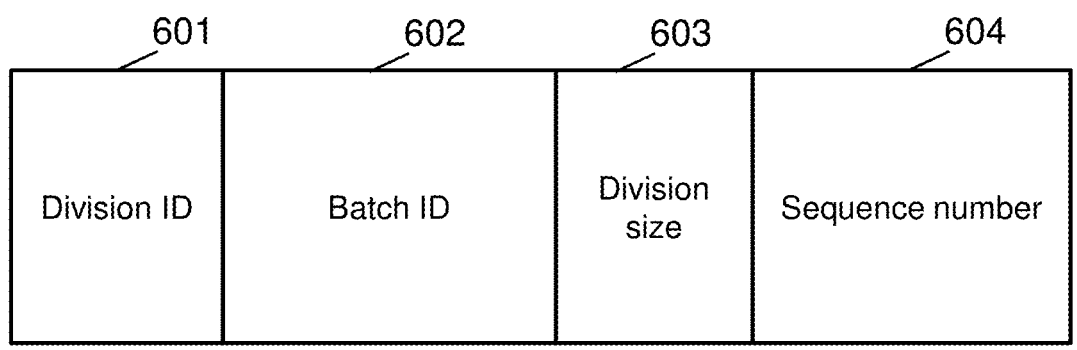
FIG. 6 shows a configuration of a divided batch request.

FIG. 6 shows a configuration of a divided batch request.

A divided batch request includes a division ID 601, a batch ID 602, a division size 603, and a sequence number 604. The division ID 601 is an ID of the divided batch request. The batch ID 602 is an ID of a batch request as a source of the divided batch request. The division size 603 is a division size used as a basis of the division of the batch request. The sequence number 604 is a number representing an execution order of the divided batch request.

When a divided batch request is created, since an execution order has not been determined, the sequence number 604 is not described in the divided batch request (for example, null). When an execution order is determined by the all-order distribution unit 133, the sequence number 604 (an execution order of the divided batch request) is described in the divided batch request by, for example, the all-order distribution unit 133 (or the control unit 132). Moreover, a sequence number in accordance with a determined execution order may also be described in an online request from the all-order distribution unit 133 to the request control unit 151.

FIG. 7 shows a configuration of the division history table 141.

The division history table 141 includes information relating to a history of division of batch requests. The division history table 141 may be included in, for example, the division unit 152. The division history table 141 includes a record for each batch request and each record stores a batch ID 701, a batch storage destination 702, a division size 703, an estimated number of divisions 704, an average execution time 705, and an average execution interval 706.

The batch ID 701 is an ID of a batch request. The batch storage destination 702 is information on a storage destination area (for example, an address) of batch data. The division size 703 is a division size used to divide the batch request. The estimated number of divisions 704 is the number of divided batch requests predicted to be obtained in the future in accordance with a current division size (the registered division size 703) based on a corresponding batch request. The average execution time 705 is an average value of the time required for divided batch processing (a batch processing portion) corresponding to one divided batch request. The average execution interval 706 is an average value of a divided batch processing interval (the time from start of divided batch processing to start of next divided batch processing).

Moreover, among the batch ID 701, the batch storage destination 702, the division size 703, the estimated number of divisions 704, the average execution time 705, and the average execution interval 706, at least the estimated number of divisions 704 may be excluded from the division history table 141.

FIG. 8 shows a configuration of the batch management table 142.

The batch management table 142 includes information relating to batch processing. The batch management table 142 may be included in, for example, the request control unit 151. The batch management table 142 includes a record for each batch request and each record stores a batch ID 801, a batch name 802, a start time point 803, an end time point 804, a position 805, a total number 806, and a number of divisions 807.

The batch ID 801 is an ID of a batch request. The batch name 802 is a display name of the batch request. The start time point 803 represents an execution start time point of the batch request (an execution start time point of a first divided batch request). The end time point 804 represents an execution end time point of the batch request (an execution end time point of a last divided batch request). The position 805 represents the number of pieces of processed data among data constituting batch data (for example, one piece of data in the batch data=one key-value). The total number 806 represents the number of pieces of data constituting the batch data. The number of divisions 807 represents the number of divided batch requests obtained based on the batch request.

Efficiency of processing can be expected based on at least one of the division history table 141 and the batch management table 142 described above.

For example, a division size once determined with respect to a batch request is registered as the division size 703 in the division history table 141. When newly creating a divided batch request based on the batch request, the division unit 152 creates the divided batch request in accordance with the registered division size 703. Accordingly, the division size 703 need not be determined (for example, by newly referring to monitoring result information) every time a divided batch request is created.

Specifically, for example, the division size 703 registered in the division history table 141 is a division size determined in an effective period (a period in which batch processing can be executed efficiently). For example, the division size 703 determined in an ineffective period (a period in which batch processing is executed inefficiently) and registered in the division history table 141 is updated by a division size determined in an effective period. Moreover, an "effective period" refers to a period in which online processing is not adversely affected such as a period in which an average latency time is shorter than a prescribed time and an online delay rate is lower than a prescribed rate. On the other hand, an "ineffective period" refers to a period in which online processing is adversely affected such as a period in which the average latency time is equal to or longer than the prescribed time or the online delay rate is equal to or higher than the prescribed rate.

Alternatively, for example, the division size 703 once determined with respect to a batch request and registered in the division history table 141 is not changed at least during a certain period with respect to the batch request.

In addition, for example, based on the average execution time 705 with respect to a batch request, an estimated batch end time point can be calculated in accordance with the following calculation formulas by the output unit 135 or another processing unit (for example, the control unit 132).

Remaining batch processing time (for example, seconds)=estimated number of divisions 704=(average execution time 705+average execution interval 706)

Estimated batch end time point=current time point+remaining batch processing time Moreover, the estimated number of divisions 704 can be calculated in accordance with the following calculation formula by the output unit 135 or another processing unit (for example, the control unit 132).

Estimated number of divisions 704=(total number 806−position 805)/division size 703

Next, screens displayed by the output unit 135 will be described with reference to FIG. 9 and FIG. 10.

FIG. 9 shows an example of a batch execution-in-progress screen.

A batch execution-in-progress screen 900 is a screen with respect to a batch request currently being executed and includes information on each batch request being executed. For example, for each batch request, the batch execution-in-progress screen 900 includes a batch name 911, a batch processing progress graph 912, a progress 913, a start time point 914, an elapsed time 915, and an estimated end time point 916. The batch name 911 is the same as the batch name 802. The batch processing progress graph 912 and the progress 913 are displayed based on the position 805 and the total number 806. The start time point 914 is the same as the start time point 803. The elapsed time 915 is displayed based on the start time point 803 and the current time point. The estimated end time point 916 is a value calculated in accordance with the calculation formula of an estimated batch end time point described above.

A purpose of displaying the batch execution-in-progress screen 900 is, for example, at least one of the following.

(X): Cancellation of batch processing. This enables a manager to determine whether or not to cancel batch processing.

(Y): Change in division size. This enables a manager to determine whether or not the division size 703 should be changed.

An example of (X) (cancellation of batch processing) is as follows. When the time from the current time point to the estimated end time point is equal to or longer than a prescribed time and progress is lower than a prescribed rate, the manager or any of the processing units may issue a cancellation request of batch processing. A cancellation request may include a batch ID of a batch request that is a cancellation target. When a cancellation request is issued, the batch processing is interrupted and an initial state prior to batch execution is restored. Specific examples are as described below.

(1) When the control unit 132 (the request control unit 151) updates the data store 501 in accordance with a divided batch request, a difference between the data store 501 before the update and the data store 501 after the update is to be managed. For example, when the control unit 132 executes a first divided batch request with respect to a new batch request, the control unit 132 secures a snapshot of the data store 501 prior to the update. Accordingly, when the batch processing is canceled, the data store 501 that is a target of an update in accordance with the batch request can be restored to the data store 501 prior to the update based on the secured snapshot.

(2) The control unit 132 (the request control unit 151) discards a divided batch request corresponding to a batch request that is a cancellation target from a storage resource (for example, the main storage device 124).

(3) The control unit 132 (the request control unit 151) transfers a cancellation request to the second server computer 111B. At the second server computer 111B that is the transfer destination, the control unit 132B (for example, the request control unit 151B) discards a divided batch request corresponding to a batch request that is a cancellation target from a storage resource (for example, a main storage device 124B) and, at the same time, restores a data store 501B that is a target of an update in accordance with the batch request to the data store 501B prior to the update based on a secured snapshot.

Moreover, the output unit 135 may calculate (A) a time point at which a cancellation process of batch processing can be started and (B) an estimated end time point with respect to the cancellation process of batch processing. The output unit 135 may calculate at least one of (A) and (B) based on, for example, at least one of (a) the time required to restore a data store to the data store prior to update and (b) the total number 806 and the position 805 corresponding to one batch request. The output unit 135 may display the calculated time points on the batch execution-in-progress screen 900. Accordingly, it is expected that a manager can more readily determine whether or not to cancel batch processing.

In addition, an example of (Y) (change in division size) is as follows. The manager may issue a division size configuration request which specifies a division size after change and a batch ID, and the control unit 132 (for example, the division unit 152) may receive the request via the input unit 134 and overwrite the division size 703 corresponding to the batch ID included in the request with the division size specified by the request. Moreover, for each batch request, the output unit 135 may display the current division size 703 on the batch execution-in-progress screen 900. The manager can determine a division size after change based on the division sizes.

FIG. 10 shows an example of a batch execution result screen.

A batch execution result screen 1000 is a screen with respect to one batch request and is displayed when, for example, execution of a batch request is finished. For example, with respect to a batch request of which execution is finished, the batch execution result screen 1000 includes a batch name 1001, a start time point 1002, an end time point 1003, a total execution time 1004, the number of divisions 1005, an average latency time 1006, an online delay rate 1007, an effective period 1008, and an ineffective period 1009. The batch name 1001 is the same as the batch name 802. The start time point 1002 and the end time point 1003 are the same as the start time point 803 and the end time point 804, and the total execution time 1004 is a difference between the start time point 804 and the start time point 803. The number of divisions 1005 is the same as the number of divisions 807. The average latency time 1006, the online delay rate 1007, the effective period 1008, and the ineffective period 1009 are respectively displayed based on monitoring result information.

Based on the batch execution result screen 1000, the manager can determine execution start timings (input timings) of a next and subsequent batch requests. Moreover, with respect to at least one of the effective period 1008 and the ineffective period 1009, only a most effective (a most ineffective) period may be displayed or a prescribed number of periods corresponding to an effective (ineffective) period may be described.

Hereinafter, respective operations of the request control unit 151, the division unit 152, and the all-order distribution unit 153 will be described.

Figure 11:
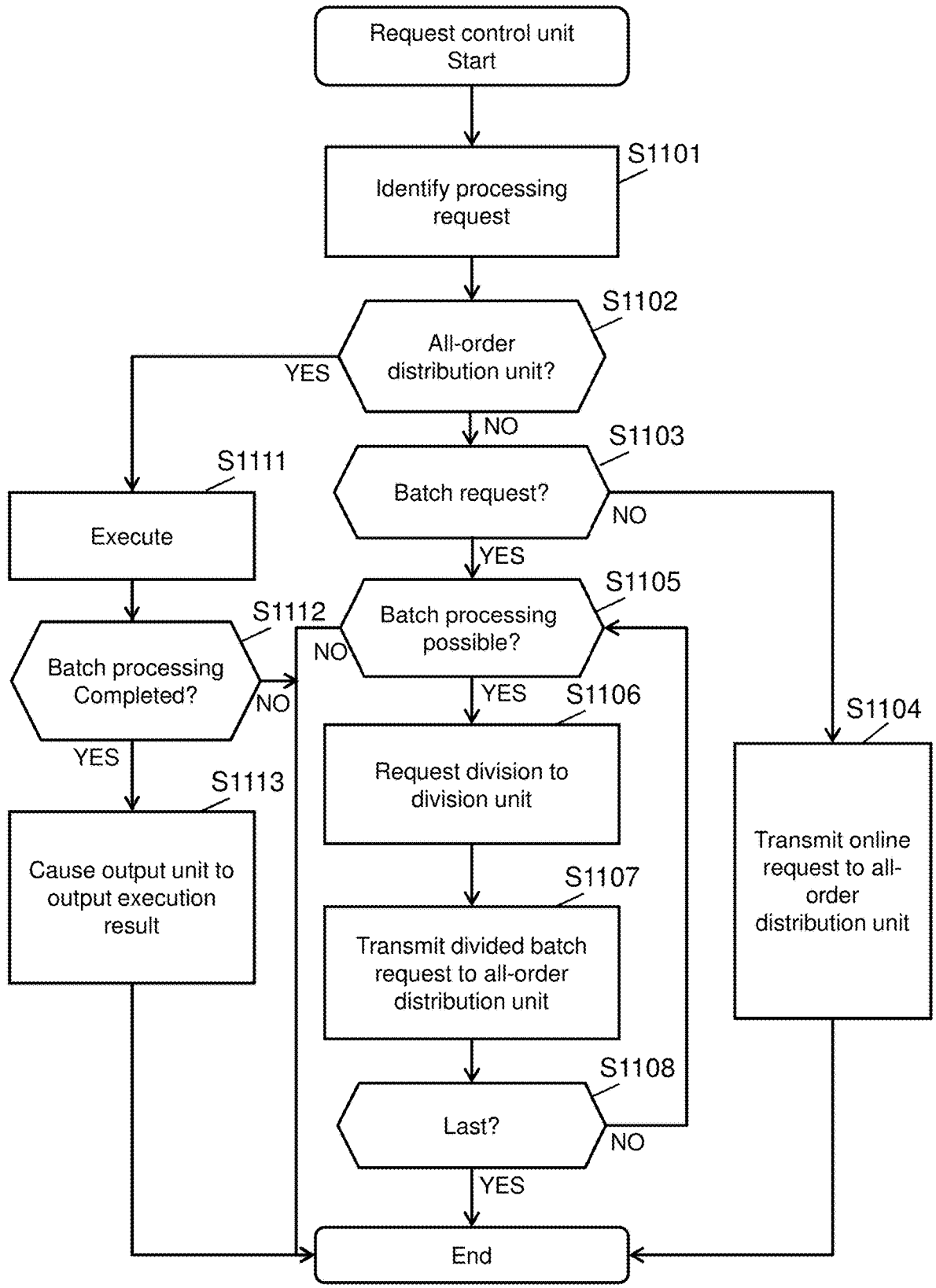
FIG. 11 is a flow chart of operations of a request control unit.

FIG. 11 is a flow chart of operations of the request control unit 151.

The request control unit 151 identifies a processing request (S1101). With respect to S1101, a processing request is, for example, any of a received online request, a received batch request, a batch request currently being divided, and a received divided batch request. Moreover, when a plurality of types of processing requests exist, the request control unit 151 may refrain from identifying an online request within a certain period (for example, an online processing execution period or an allowed latency time) after identifying an online request.

When a transmission source of the processing request identified in S1101 is the all-order distribution unit 133 (YES in S1102), the request control unit 151 executes the identified processing request (S1111). When a batch request has been completed (YES in S1112), the request control unit 151 causes the output unit 135 to display a batch execution result screen with respect to the batch request (S1113).

When the transmission source of the processing request identified in S1101 is not the all-order distribution unit 133 (NO in S1102), the request control unit 151 determines whether or not the identified processing request is a batch request (S1103).

When a result of the determination in S1103 is negative (NO in S1103) or, in other words, when the identified processing request is an online request, the request control unit 151 sends the online request to the all-order distribution unit 133 (S1104).

When the result of the determination in S1103 is positive (YES in S1103), the request control unit 151 determines whether or not batch processing can be executed (S1105).

The determination of S1105 may be related to, for example, whether or not monitoring result information from the monitoring unit 131 indicates that no online processing is being executed. When a result of the determination in S1105 is negative (NO in S1105), the request control unit 151 may temporarily store the batch request and temporarily end operations so that another processing request can be received, and the temporarily-stored batch request (a batch request being divided) may be identified in S1101 at a prescribed timing such as after a certain period has elapsed. Moreover, when the determination of S1105 is a determination of whether or not monitoring result information from the monitoring unit 131 indicates that no online processing is being executed and a result of the determination is positive, a divided batch request is created as will be described later. Therefore, a divided batch request can be arranged to be created when load on the server computer 111 is relatively low.

When the result of the determination in S1105 is positive (YES in S1105), the request control unit 151 requests the division unit 152 to divide the received batch request (S1106). The request may include a batch ID of the batch request. The request control unit 151 receives a divided batch request created based on the batch request in response to the request and sends the divided batch request to the all-order distribution unit 133 (S1107).

When the divided batch request sent in S1107 is a last divided batch request with respect to the batch request received in S1101 (YES in S1108), the request control unit 151 ends the operation.

On the other hand, when the divided batch request sent in S1107 is not the last divided batch request with respect to the batch request received in S1101 (NO in S1108), the request control unit 151 returns to S1105. When the result of the determination in S1105 is positive, S1106 and S1107 are performed with respect to a same batch request. When the result of the determination in S1105 is negative (for example, when a loop constituted by S1105 to S1108 is repeated a certain number of times), the request control unit 151 ends the operation. In this case, since division of the batch request is ongoing, the request control unit 151 may temporarily store the batch request and the temporarily-stored batch request (a batch request being divided) may be identified in S1101 at a prescribed timing such as after a certain period has elapsed. From which point batch processing (creation of a divided batch request) is to be restarted is determined by, for example, using information such as the position 805 in the batch management table.

Figure 12:
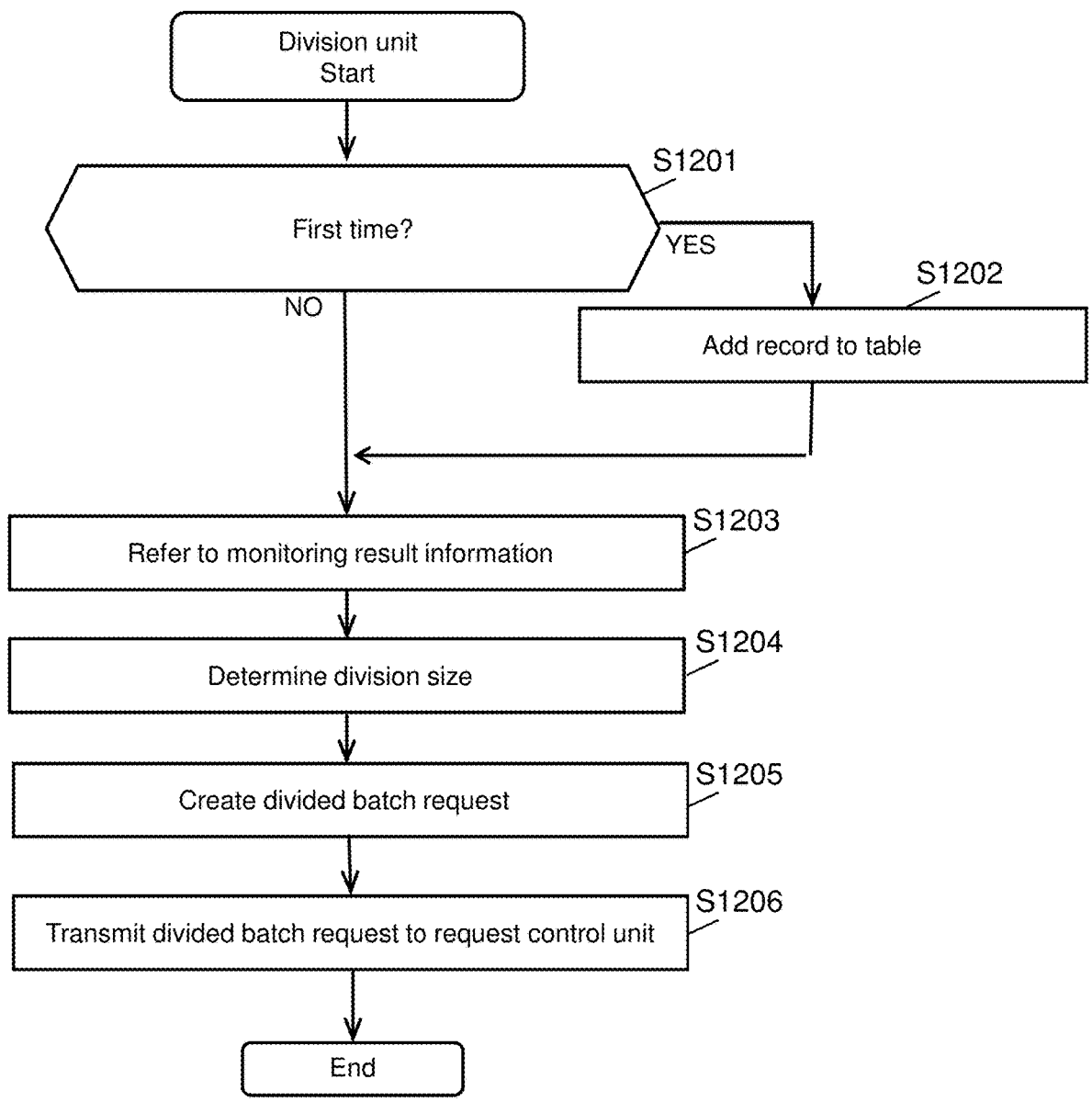
FIG. 12 is a flow chart of operations of a division unit.

FIG. 12 is a flow chart of operations of the division unit 152.

Based on a batch ID in a division request from the request control unit 151 and on the division history table 141, the division unit 152 determines whether or not a batch request that is a target of the division request is a batch request that has been set as a division target for the first time (S1201). When the same batch ID 701 as the batch ID in the division request is absent from the division history table 141, the batch request that is the division target is a batch request that has been set as a division target for the first time (YES in S1201). In this case, the division unit 152 adds a record including the batch ID in the division request to the division history table 141 (and the batch management table 142).

When No in S1201 or after S1202, the division unit 152 refers to monitoring result information from the monitoring unit 131 (S1203) and determines a division size based on at least a part of the monitoring result information (and a policy) (S1204). The division size determined in S1204 is registered in the division history table 141. When the division size 703 is already registered in the division history table 141, the division size 703 is changed to the division size determined in S1204. Moreover, in place of S1203 and S1204, the division size 703 registered in the division history table 141 may be determined as the division size to be used.

Based on the determined division size, the division unit 152 creates a divided batch request based on the batch request that is a division target (S1205). The division unit 152 sends the created divided batch request to the request control unit 151 (S1206).

Figure 13:
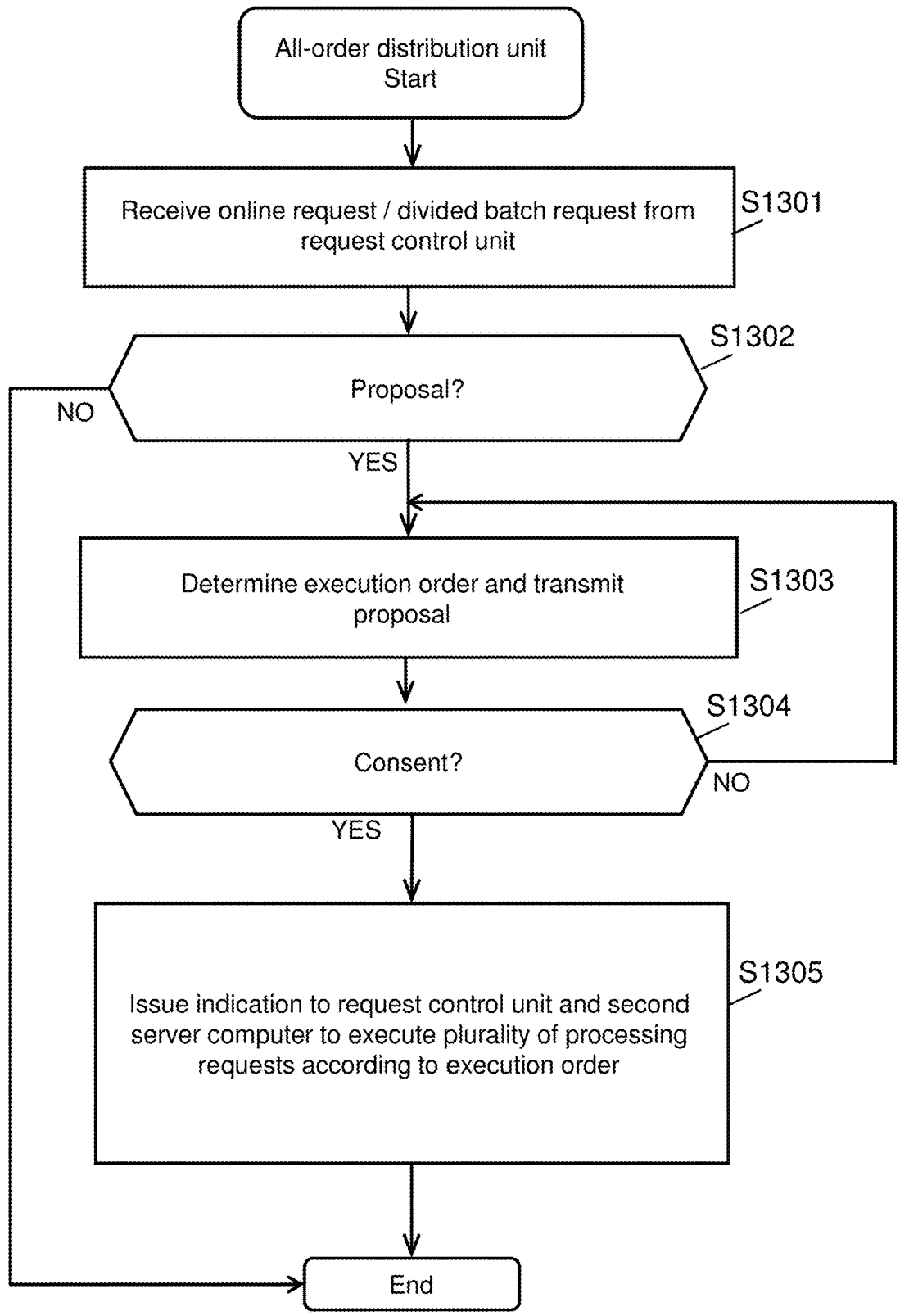
FIG. 13 is a flow chart of operations of an all-order distribution unit.

FIG. 13 is a flow chart of operations of the all-order distribution unit 133.

The all-order distribution unit 133 receives a processing request (an online request or a divided batch request) from the request control unit 151 (S1301). When proposal creation conditions such as the number of unexecuted processing requests being equal to or larger than a prescribed number are not satisfied (NO in S1302), the all-order distribution unit 133 ends the operation.

When the proposal creation conditions are satisfied (YES in S1302), the all-order distribution unit 133 creates a proposal and transmits the proposal to the second server computer 111B. Creating a proposal refers to determining an execution order of a plurality of processing requests. However, in addition to a plurality of processing requests, the all-order distribution unit 133 may create a proposal with only one processing request. For example, the all-order distribution unit 133 may be configured to create a proposal on a regular basis and, when there is only one processing request at a timing of creating a proposal, the all-order distribution unit 133 may create a proposal with respect to the one processing request. An execution order may be determined based on at least a part of a policy and monitoring result information.

When consent cannot be obtained from a certain number or more of the second server computers 111B (NO in S1304), the all-order distribution unit 133 returns to S1303. Accordingly, a different proposal is to be created and transmitted.

When consent is obtained from a certain number or more of the second server computers 111B (YES in S1304), the all-order distribution unit 133 issues an indication for the proposal created in S1303 (to execute the plurality of processing requests that are processing targets in the determined execution order) to the request control unit 151A in the first server computer 111A and to the all-order distribution unit 133B in the second server computer 111B. Accordingly, in the first server computer 111A, the request control unit 151A executes the plurality of processing requests in the determined execution order. In the second server computer 111B, the all-order distribution unit 133B issues an indication to the request control unit 151B in the second server computer 111B to execute the plurality of processing requests in the determined execution order and the request control unit 151B executes the plurality of processing requests in the execution order.

The respective operations of the request control unit 151, the division unit 152, and the all-order distribution unit 133 are as described above.

Hereinafter, several perspectives of division size determination by the division unit 152 will be described.

Figure 14:
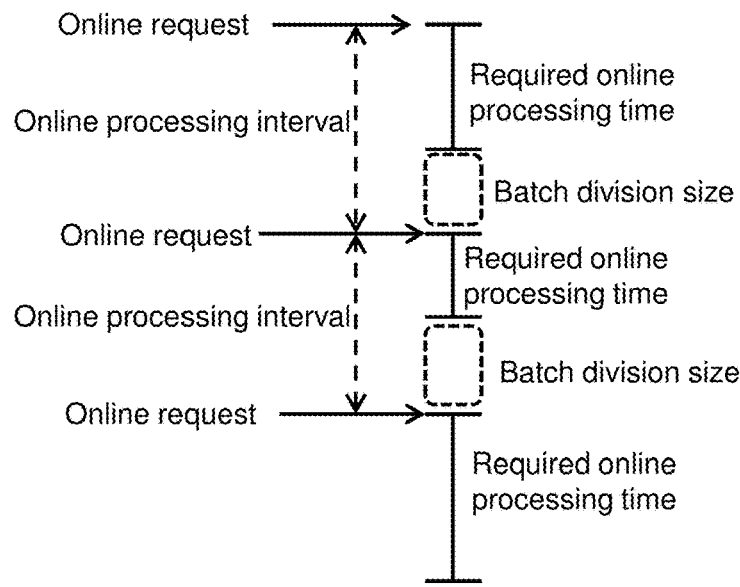
FIG. 14 shows a first perspective of division size determination.

FIG. 14 shows a first perspective of division size determination.

According to the first perspective, a specific online processing interval is longer than a specific required online processing time. At least one of the specific online processing interval and the specific required online processing time is calculated by, for example, the division unit 152 based on monitoring result information (or an accumulation thereof).

A "specific online processing interval" is a value determined based on one or more online processing intervals such as an average value, a maximum value, or a minimum value of the one or more online processing intervals. In the present embodiment, an average value is adopted. An "online processing interval" refers to the time from start of an N-th (where N is an integer equal to or larger than 1) online processing session to start of an (N+1)-th online processing session.

A "specific required online processing time" is a value determined based on one or more required online processing times such as an average value, a maximum value, or a minimum value of the one or more required online processing times. In the present embodiment, an average value is adopted. A "required online processing time" refers to the time required for one session of online processing (processing of one online request).

According to the first perspective, a division size is a value obtained by subtracting an average online processing interval from an average required online processing time.

Figure 15:
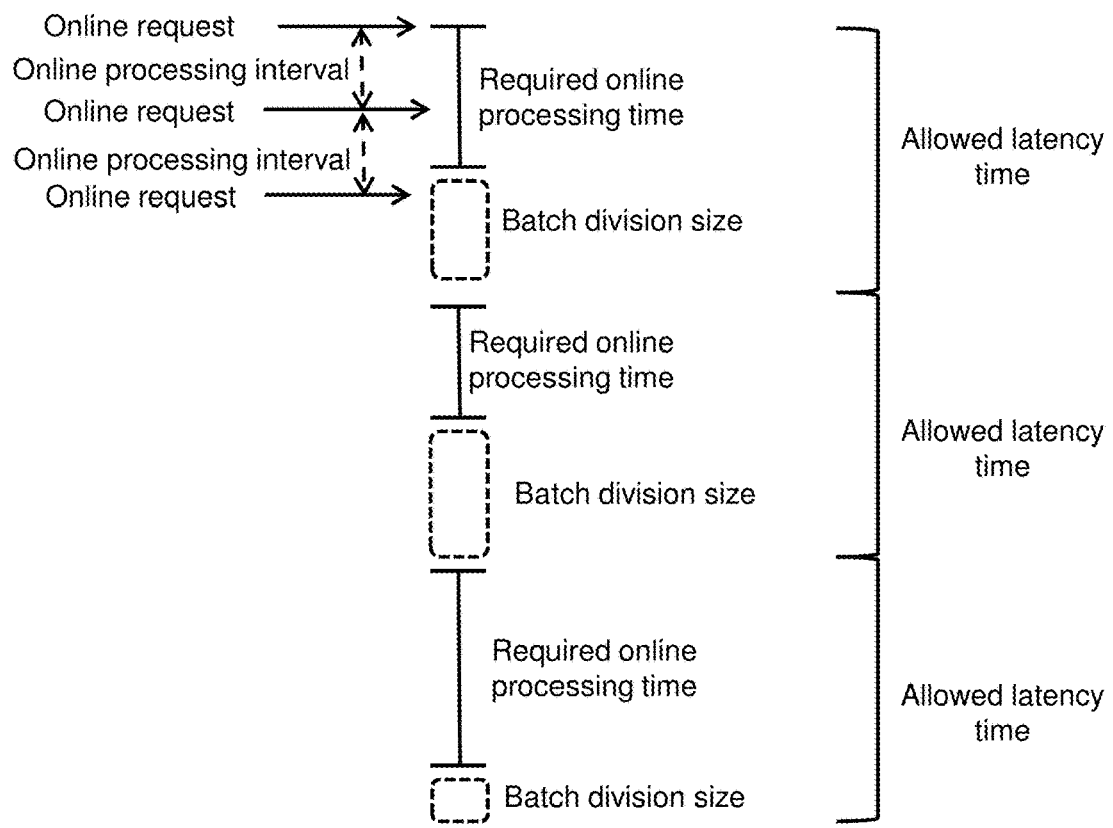
FIG. 15 shows a second perspective of division size determination.

FIG. 15 shows a second perspective of division size determination.

According to the second perspective, an average online processing interval (an example of a specific online processing interval) is equal to or shorter than an average required online processing time (an example of a specific required online processing time). An "allowed latency time" refers to an allowable value of an average required online processing time. The allowed latency time may be, for example, information input by the manager via the input unit 134.

According to the second perspective, a division size is a value obtained by subtracting an average required online processing time from an allowed latency time.

This concludes the description of several perspectives of division size determination. Either perspective enables an appropriate division size to be determined. In either perspective, a size of data corresponding to a divided batch request created in accordance with a determined division size may be a same size as the division size.

Moreover, either perspective may also be applied to controlling (changing) an execution interval in place of, or in addition to, division size determination. "Execution" in "execution interval" may refer to (Execution 1) the division unit 152 creating a divided batch request (in other words, the request control unit 151 issuing a division request to the division unit 152), and (Execution 2) the all-order distribution unit 133 determining an execution order. Therefore, "controlling an execution interval" may refer to either controlling a timing (interval) of Execution 1 or controlling a timing (interval) of Execution 2. (A) to (E) below represent specific examples of controlling an execution interval. A decline in online performance can be reduced by controlling an execution interval.

(A) A time interval (parameter) specified via the input unit 134 or the like is an interval of Execution 1 or an interval of Execution 2.

(B) A timing at which a same number of online requests as the number of online requests (parameter) specified via the input unit 134 or the like is a timing of Execution 1 or Execution 2.

(C) A time point during a period in which an online processing load identified based on monitoring result information is less than a threshold (allowed latency time or the like) or a time point during a period in which an online delay rate identified based on monitoring result information is lower than a threshold is a timing of Execution 1 or Execution 2.

(D) An interval (timing) determined by the control unit 132 or the all-order distribution unit 133 based on a state of progress of batch processing that is identified based on monitoring result information and a target end time point (a target end time point of batch processing) that is specified via the input unit 134 or the like is an interval of Execution 1 or an interval of Execution 2.

(E) When batch processing is processing (for example, a data copy process) that requires data transfer via the communication network 171, a network load applies on the data transfer. Therefore, the monitoring unit 131 monitors network band usage. A time point during a period in which network band usage identified based on monitoring result information is less than a threshold is a timing of Execution 1 or Execution 2.

While an embodiment has been described above, it is to be understood that the embodiment merely represents an example for illustrating the present invention and that the scope of the present invention is not limited to the embodiment. The present invention can be implemented in various other modes.

For example, a distributed system constituted by a plurality of processes (for example, virtual computers) may be constructed in a physical computer, a plurality of data stores respectively accessed by the plurality of processes may be provided (for example, so-called in-memory) in a storage resource (such as a memory) in the physical computer, and an execution order of a plurality of processing requests may be the same among the processes.

Figure 16:
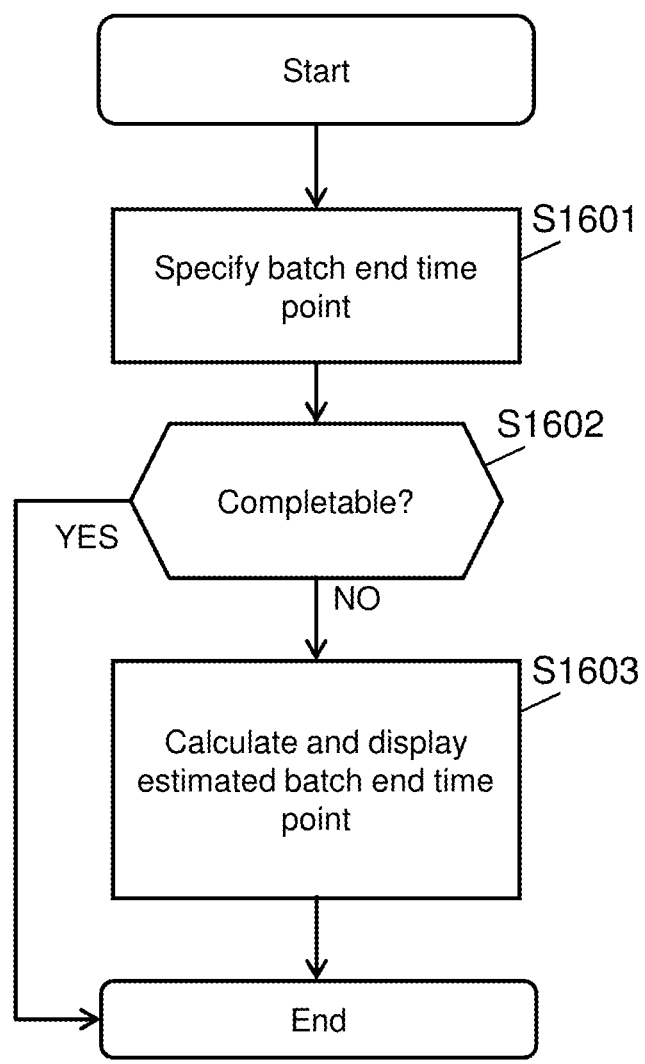
FIG. 16 shows an example of processing performed when a batch end time point is input.

In addition, for example, processing illustrated in FIG. 16 may be performed. Specifically, the input unit 134 receives specification of a batch ID and a batch end time point (a target value) from the manager (S1601), and the control unit 132 (for example, the request control unit 151) determines whether or not batch processing of a batch request corresponding to the specified batch ID can be completed until the input batch end time point (S1602). For example, the control unit 132 makes the determination of S1602 based on the division history table 141 (for example, the average execution time 705, the average execution interval 706, and the division size 703) and the batch management table 142 (for example, the start time point 803, the position 805, and the total number 806). When a result of the determination in S1602 is negative, the control unit 132 or the output unit 135 calculates an estimated batch end time point of the batch request specified in S1601 based on the division history table 141 (for example, the average execution time 705, the average execution interval 706, and the division size 703) and the batch management table 142 (for example, the start time point 803, the position 805, and the total number 806), and the output unit 135 outputs (for example, displays) the estimated batch end time point. Accordingly, when it is determined that batch processing cannot be completed before the specified batch end time point, the manager can be informed of an estimated batch end time point.

REFERENCE SIGNS LIST

101 Server system (distributed system)

The invention claimed is:

1. A computer system comprising:
    a plurality of processes configured to execute one or more first processing requests received online and one or more second processing requests for batch processing;
    a control unit configured to divide the one or more second processing requests for batch processing in accordance with a division size determined in advance, wherein the control unit does not divide the one or more first processing requests; and
    an all-order distribution unit configured to receive the one or more divided second processing requests and the one or more first processing requests that are not divided, determine an execution order of the one or more first processing requests and the one or more divided second processing requests and transmit a proposal which includes the determined execution order to all-order distribution units in other computer systems,
    wherein, when the all-order distribution unit of the computer system receives consent to the transmitted proposal from at least a predetermined number of the other computer systems, the all-order distribution unit of the computer system respectively causes the plurality of processes to execute the one or more first processing requests and the one or more divided second processing requests in the determined execution order, and
    the all-order distribution unit determines the execution order of the one or more first processing requests and the one or more divided second processing requests such that the one or more first processing requests are executed serially with the one or more divided second processing requests, whereby the computer system processes the first processing requests and the one or more divided second processing requests in the same order serially as the other computer systems to maintain consistency among the computer system and the other computer systems.

2. The computer system according to claim 1,
    wherein the computer system further comprises a monitoring unit configured to monitor an execution state of data processing,
    wherein the control unit is configured to execute, when monitoring result information output by the monitoring unit indicates that no first processing request of the one or more first processing requests is being executed, a divided second processing request of the one or more divided second processing requests, and
    wherein the monitoring result information includes first processing time information which includes information indicating a time required for executing data of the one or more first processing requests.

3. The computer system according to claim 2, further comprising an output unit configured to output delay information which is information relating to a delay in execution of the first processing request and which is calculated based on the monitoring result information.

4. The computer system according to claim 3, further comprising:
    an input unit configured to receive information relating to an end time point of the divided second processing request; and
    wherein the monitoring result information includes first processing state information which is information relating to an execution state of the first processing request,
    the control unit is configured to determine, based on the first processing state information, whether or not the divided second processing request can be completed before the end time point received by the input unit, and when the control unit determines that the divided second processing request cannot be completed before the end time point, the output unit is configured to output an estimated end time point of the divided second processing request.

5. The computer system according to claim 2, further comprising:
an input unit configured to receive information relating to an end time point of the divided second processing request; and
an output unit, wherein
the monitoring result information includes first processing state information which is information relating to an execution state of the first processing request,
the control unit is configured to determine, based on the first processing state information, whether or not the divided second processing request can be completed before the end time point received by the input unit, and
the output unit is configured, when the control unit determines that the divided second processing request cannot be completed before the end time point, to output an estimated end time point of the divided second processing request.

6. The computer system according to claim 1, wherein each of the plurality of processes includes the control unit and the all-order distribution unit, and
the all-order distribution unit of a target process, which is a process having received the one or more first processing requests and the one or more divided second processing requests, is configured to cause the control unit of the target process and at least one process other than the target process to execute a portion of the one or more first processing requests and the one or more divided second processing requests in the determined execution order.

7. The computer system according to claim 1, wherein two or more divided second processing requests are respectively performed within a plurality of idle times, which respectively indicate a time when processing of one or the one or more first processing requests is not processed, and
wherein each idle time is time during which data processing on the one or more first processing requests is not being performed.

8. The computer system according to claim 1, wherein when a specific first processing interval is longer than a specific first required processing time, an idle time is a difference between the specific first processing interval and the specific first required processing time,
when the specific first processing interval is equal to or shorter than the specific first required processing time, the idle time is a difference between an allowed latency time and the specific first required processing time,
the specific first required processing time is a value determined based on one or more first required processing times and a first required processing time is time required to execute the first processing request,
the specific first processing interval is a value determined based on one or more specific first processing intervals and a first processing interval is time from start of data processing on the first processing request to start of data processing on a next first processing request,
an allowed latency time is an allowed value of the specific first required processing time, and
the control unit is configured to determine the division size, based on the idle time.

9. The computer system according to claim 1, wherein at least one of an interval during which a divided second processing request of the one or more divided second processing requests is created and an interval during which the execution order is determined is changed based on at least one of an execution state of data processing and a specified parameter.

10. The computer system according to claim 1, wherein when the all-order distribution unit of the computer system receives consent to the transmitted proposal from the at least a predetermined number of the other computer systems, the all-order distribution unit of the computer system is configured to assign a sequence number to the one or more first processing requests and the one or more divided second processing requests according to the determined execution order.

11. A data processing method in a computer system, comprising:
executing, by a plurality of processes, one or more first processing requests received online and one or more second processing requests for batch processing; dividing, by a control unit, the one or more second processing requests for batch processing in accordance with a division size determined in advance, wherein the control unit does not divide the one or more first processing requests;
receiving, by an all-order distribution unit the one or more divided second processing requests and the one or more first processing requests that are not divided; and
determining, by the all-order distribution unit, an execution order of the one or more first processing requests and the one or more divided second processing requests and transmitting a proposal which includes the determined execution order to all-order distribution units in other computer systems,
wherein, when the all-order distribution unit of the computer system receives consent to the transmitted proposal from at least a predetermined number of the other computer systems, respectively causing the plurality of processes to execute the one or more first processing requests and the one or more divided second processing requests in the determined execution order, and
wherein the all-order distribution unit determines the execution order of the one or more first processing requests and the one or more divided second processing requests such that the one or more first processing requests are executed serially with the one or more divided second processing requests, whereby the computer system processes the first processing requests and the one or more divided second processing requests in the same order serially as the other computer systems to maintain consistency among the computer system and the other computer systems.

12. The method according to claim 11, wherein when the all-order distribution unit of the computer system receives consent to the transmitted proposal from the at least a predetermined number of the other computer systems, assigning, by the all-order distribution unit of the computer system a sequence number to the one or more first processing requests and the one or more divided second processing requests according to the determined execution order.

13. A computer coupled to other computers, the computer comprising:
a plurality of processes configured to execute one or more first processing requests received online and one or more second processing requests for batch processing;

a control unit configured to divide the one or more second processing requests for batch processing in accordance with a division size determined in advance, wherein the control unit does not divide the one or more first processing requests; and an all-order distribution unit configured to receive the one or more divided second processing requests and the one or more first processing requests that are not divided, determine an execution order of the one or more first processing requests and the one or more divided second processing requests and transmit a proposal which includes the determined execution order to all-order distribution units in the other computers, wherein, when the all-order distribution unit of the computer system receives consent to the transmitted proposal from at least a predetermined number of the other computers, the all-order distribution unit of the computer respectively causes the plurality of processes to execute the one or more first processing requests and the one or more divided second processing requests in the determined execution order, and the all-order distribution unit determines the execution order of the one or more first processing requests and the one or more divided second processing requests such that the one or more first processing requests are executed serially with the one or more divided second processing requests, whereby the computer processes the first processing requests and the one or more divided second processing requests in the same order serially as the other computers to maintain consistency among the computer and the other computers.

14. The computer according to claim 13, wherein when the all-order distribution unit of the computer receives consent to the transmitted proposal from the at least a predetermined number of the other computer systems, the all-order distribution unit of the computer is configured to assign a sequence number to the one or more first processing requests and the one or more divided second processing requests according to the determined execution order.

\* \* \* \* \*